(No Model.) 3 Sheets—Sheet 1.
T. W. LANGILL.
VAULT LIGHT AND VENTILATOR.
No. 399,419. Patented Mar. 12, 1889.
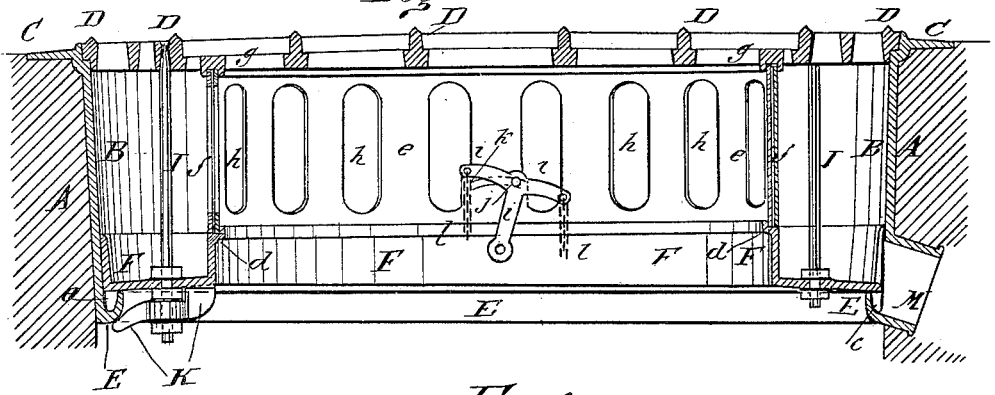
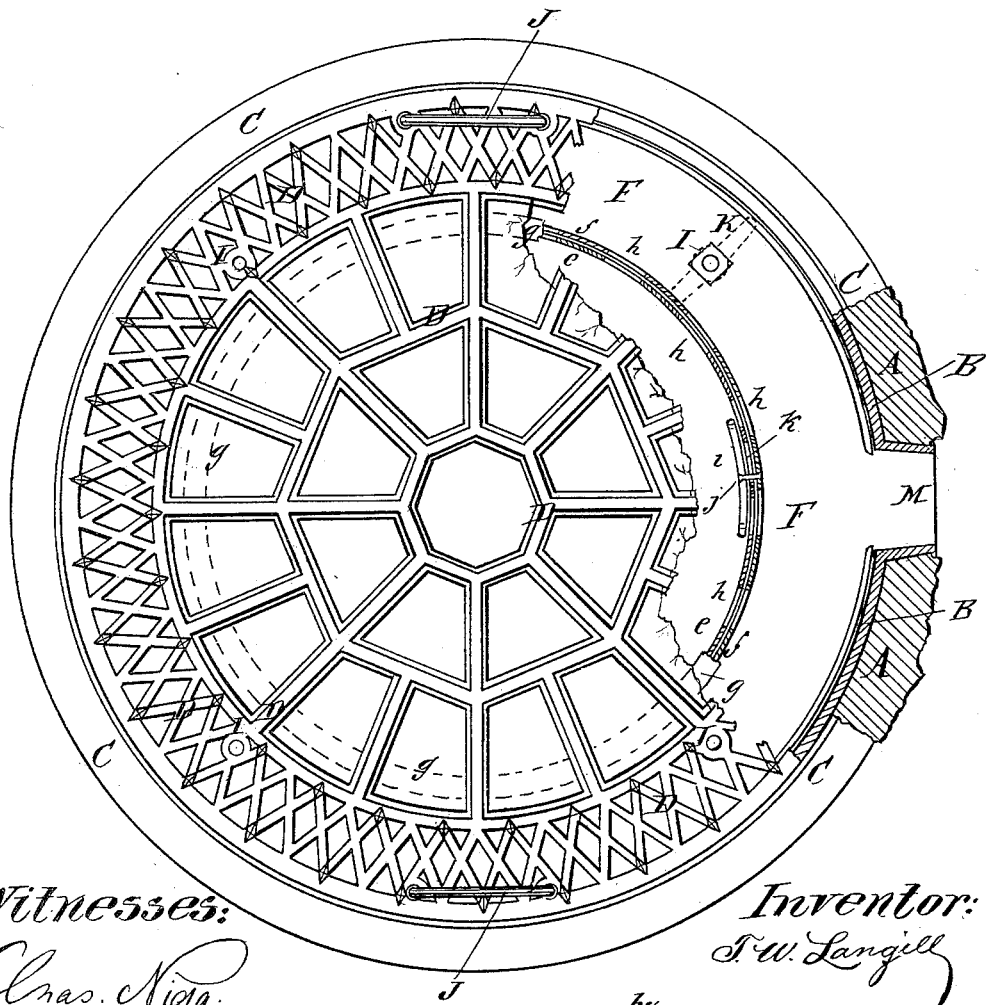

(No Model.) 3 Sheets—Sheet 2.

T. W. LANGILL.
VAULT LIGHT AND VENTILATOR.

No. 399,419. Patented Mar. 12, 1889.

Witnesses:
Chas. Nida
C. Sedgwick

Inventor:
T. W. Langill
by Munn & Co.
Attorneys.

(No Model.) 3 Sheets—Sheet 3.
T. W. LANGILL.
VAULT LIGHT AND VENTILATOR.
No. 399,419. Patented Mar. 12, 1889.
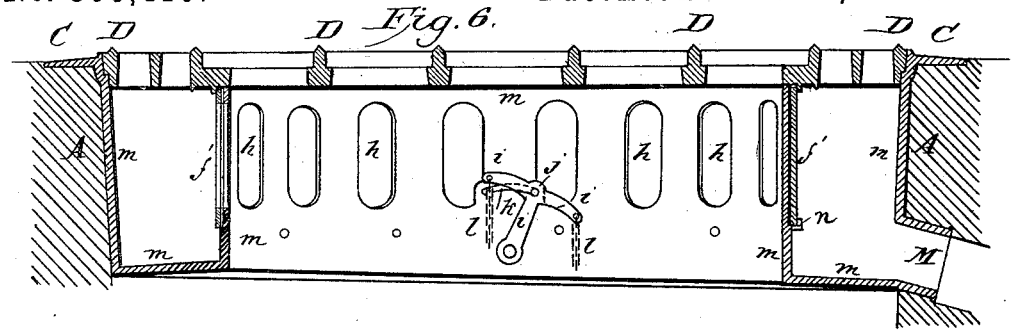
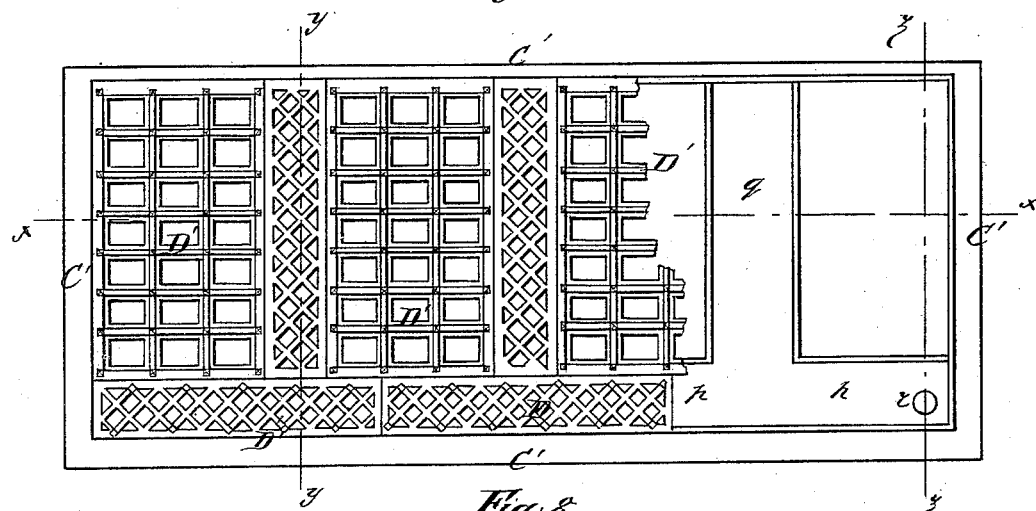
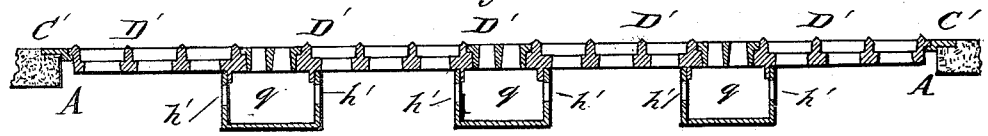
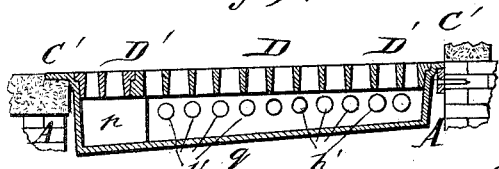
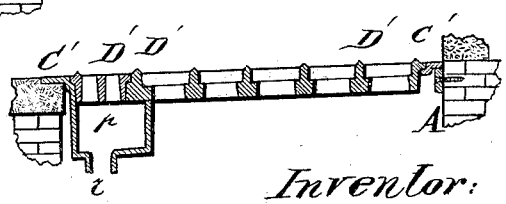

UNITED STATES PATENT OFFICE.

THEOPHILUS WESLEY LANGILL, OF NEW YORK, N. Y.

VAULT LIGHT AND VENTILATOR.

SPECIFICATION forming part of Letters Patent No. 399,419, dated March 12, 1889.

Application filed February 14, 1885. Renewed March 8, 1887. Again renewed October 24, 1888. Serial No. 289,021. (No model.)

*To all whom it may concern:*

Be it known that I, THEOPHILUS WESLEY LANGILL, of the city, county, and State of New York, have invented a new and useful Improvement in Vault Lights and Ventilators, of which the following is a full, clear, and exact description.

Reference is to be had to the accompanying drawings, forming a part of this specification, in which similar letters of reference indicate corresponding parts in all the figures.

Figure 3:
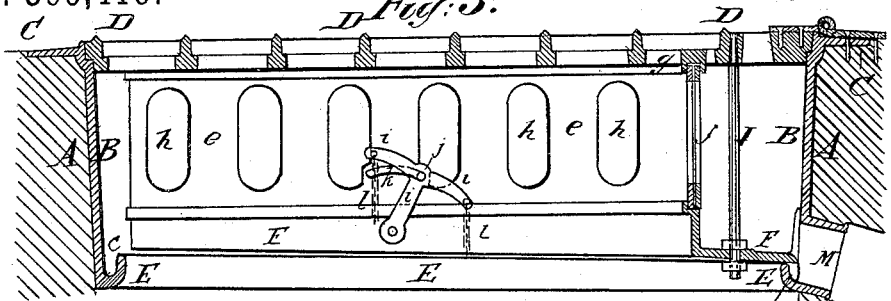
Figure 4:
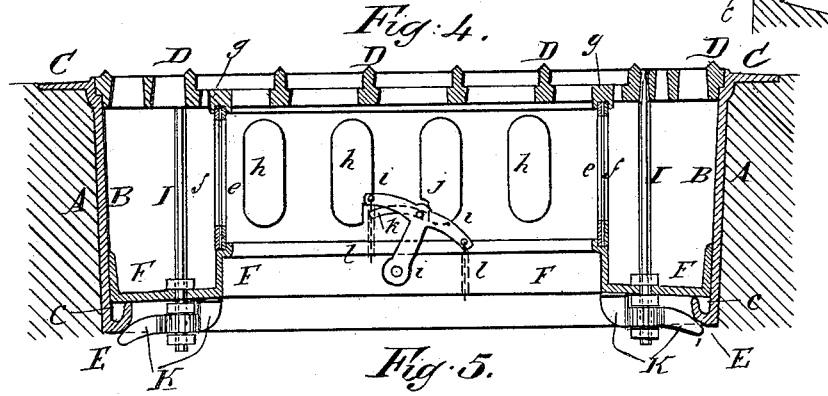
Figure 5:
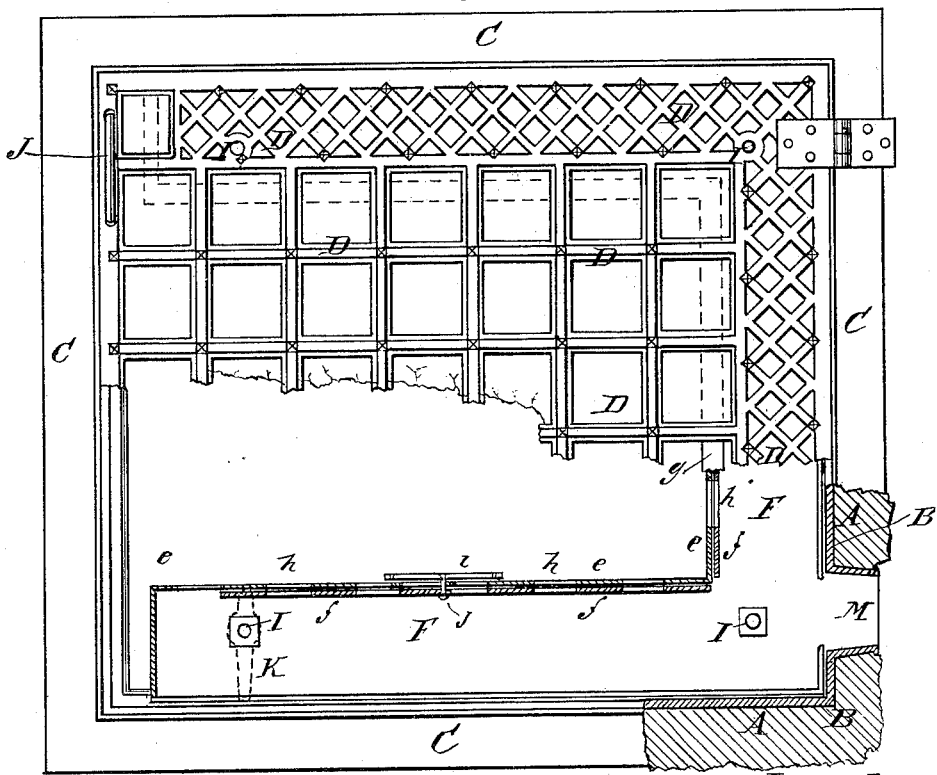

Figure 1, Sheet 1, is a sectional elevation of one of my improved vault lights and ventilators. Fig. 2, Sheet 1, is a plan view of the same, part being broken away. Fig. 3, Sheet 2, is a sectional side elevation of one of my improved vault lights and ventilators, showing a modification in form. Fig. 4, Sheet 2, is a sectional front elevation of the same. Fig. 5, Sheet 2, is a plan view of the same, part being broken away. Fig. 6, Sheet 3, is a sectional side elevation of one of my improved vault lights and ventilators, showing a modification. Fig. 7, Sheet 3, is a plan view of one of my improved vault lights and ventilators, showing another modification, and part being broken away. Fig. 8, Sheet 3, is a sectional side elevation of the same, taken through the line $x\,x$, Fig. 7. Fig. 9, Sheet 3, is a sectional end elevation of the same, taken through the line $y\,y$, Fig. 7. Fig. 10, Sheet 3, is a sectional end elevation of the same, taken through the line $z\,z$, Fig. 7.

The object of this invention is to simplify the construction of the vault covers and ventilators for which Letters Patent No. 289,663 were issued to me December 4, 1883, in such a manner as to make them simpler in construction and less expensive in manufacture.

The invention relates to a vault light and ventilator constructed with its grating and the inner flange of its channel-plate connected by a stationary apertured plate having a curved slot and a movable correspondingly-apertured plate, and the three-armed lever and its chains for operating the said movable plate, as will be hereinafter fully described, and then claimed.

A represents an opening through a sidewalk or other structure into a vault or chamber, and which is to be provided with a cover. B is a suitable casing fitted into the opening A, and having an outwardly-projecting flange, C, around its upper edge to rest in a rabbet formed around the opening A, and thus support the said casing B and its attachments.

The inner side of the upper casing, B, is rabbeted, beveled, or flared to form a seat for the grating D and firmly support the said grating in such a position that its upper surface will be flush with or but little above the surface of the sidewalk.

The annular outer part of the grating D is made with small meshes to allow air to pass through freely, while preventing coarse rubbish from dropping through the said meshes into the vault or chamber beneath.

The middle part of the grating D is made with large meshes to receive glass plates to allow light to pass through, while excluding rain, snow, and rubbish.

Upon the lower part of the casing B is formed an inwardly-projecting flange, E, for the water-receiving channel-plate F to rest upon, which channel-plate fits snugly into the interior of the casing B, and is connected with the grating D by four (more or less) rods, I. The rods I at their upper ends are riveted or otherwise secured to the grating D and their lower ends pass through the channel-plate F, and have nuts screwed upon them above and below the said channel-plate, so that the channel-plate F will be firmly supported and can be raised from the casing B by raising the grating D. The grating D is provided with handles J for convenience in inserting it in and raising it from the casing B. To the lower ends of the rods I are pivoted buttons K, which are secured in place upon the said rods by nuts. The buttons K are so formed that one end will rest against the lower side of the flange E and the other end against the lower side of the inner part of the channel-plate F. The buttons K lock the channel-plate F and grating D in place and must be turned to one side when the said channel-plate and grating are to be raised from the casing B.

The outer flange of the channel-plate F is cut away at one point to allow the water received in the said channel-plate through the open outer part of the grating D to flow out into a pipe, M, through which it flows into the sewer or other suitable receptacle.

In the flange E, beneath the outer edge of the bottom of the channel-plate F, is formed a groove or channel, $c$, to receive any water that may find its way between the casing B and the outer flange of the said channel-plate F and conduct the said water into the discharge-pipe M.

Upon the upper edge of the inner flange of the channel-plate F is formed a shoulder, $d$, upon which rest the lower edges of two concentric tubular plates, $e\ f$. The upper edges of the tubular plates $e\ f$ rest in an annular groove in the lower side of the annular rib $g$, formed upon the lower part of the grating D with its upper surface flush with the shoulders of the said grating, upon which the glass plates rest. The inner tubular plate, $e$, is stationary, and upon it slides the outer tubular plate, $f$, and through the two plates are formed corresponding slots $h$.

To the inner flange of the channel-plate F is pivoted the end of the center arm of the three-armed or T lever $i$, to the center of which is attached a pin or bolt, $j$. The pin or bolt $j$ passes through a curved slot, $k$, in the inner tubular plate, $e$, and is attached to the outer tubular plate, $f$, so that by operating the said lever $i$ the outer tubular plate, $f$, can be adjusted to bring its slots opposite the slots of the inner tubular plate, $e$, and allow air to pass through freely, or can be adjusted to bring its slots opposite the solid parts of the said inner tubular plate, $e$, and thus prevent air from passing through.

To the ends of the side arms of the three-armed lever $i$ are attached the upper ends of two chains, $l$, for convenience in adjusting the outer tubular plate, $f$, to permit or prevent the passage of air, as may be desired.

The vault light and ventilator shown in Figs. 3, 4, and 5 is made rectangular, and the grating D is hinged at one edge to the flange of the casing B, so that the said grating and its attachments can be turned back upon the said hinges to give access to the vault or chamber. In this case the channel-plate F extends along only three sides of the vault-opening, as indicated in Figs. 3 and 5.

In the modification shown in Fig. 6 the casing and the channel-plate are made in one piece, $m$, the inner flange of which is extended up to the grating D, and has ventilating-openings $h$ formed through it, which are opened and closed by a tubular plate, $f'$, resting and sliding in guides $n$, attached to the inner flange of the combined casing and channel-plate $m$, as it is operated by a three-armed lever, $i$, and its chains $l$.

In the modification shown in Figs. 7, 8, 9, and 10 the channel-plate $p$ extends along one side of the vault-opening, and with it are connected cross channel-plates $q$. In this case the casing is omitted and the grating rests in a rabbeted frame, C′, surrounding the mouth of the vault-opening A. In this case, also, the meshes in the parts of the grating D′ over the channel-plates $p\ q$ are made small and open, the larger meshes, closed with glass plates, being over the spaces between the cross channel-plates $q$, and ventilating-openings $h'$ being formed in the sides of the said cross channel-plates $q$. In one end of the side channel-plate, $p$, is formed an opening, $r$, with which is designed to be connected a pipe for carrying off the water received in the said channel-plates $p\ q$.

Having thus described my invention, I claim as new and desire to secure by Letters Patent—

1. In a vault light and ventilator, the combination, with the grating D and the inner flange of the channel-plate F, of the stationary apertured plate $e$, having curved slot $k$, the correspondingly-apertured movable plate $f$, the three-armed lever $i$, and its chains $l$, substantially as herein shown and described.

2. In a vault cover and ventilator, the grating D, made, substantially as herein shown and described, with open-work near the outer edge of the cover in the parts over the water-receiving channel-plate and with the other parts adapted to receive glass plates, as set forth.

T. WESLEY LANGILL.

Witnesses:
   JAMES T. GRAHAM,
   C. SEDGWICK.